UNITED STATES PATENT OFFICE.

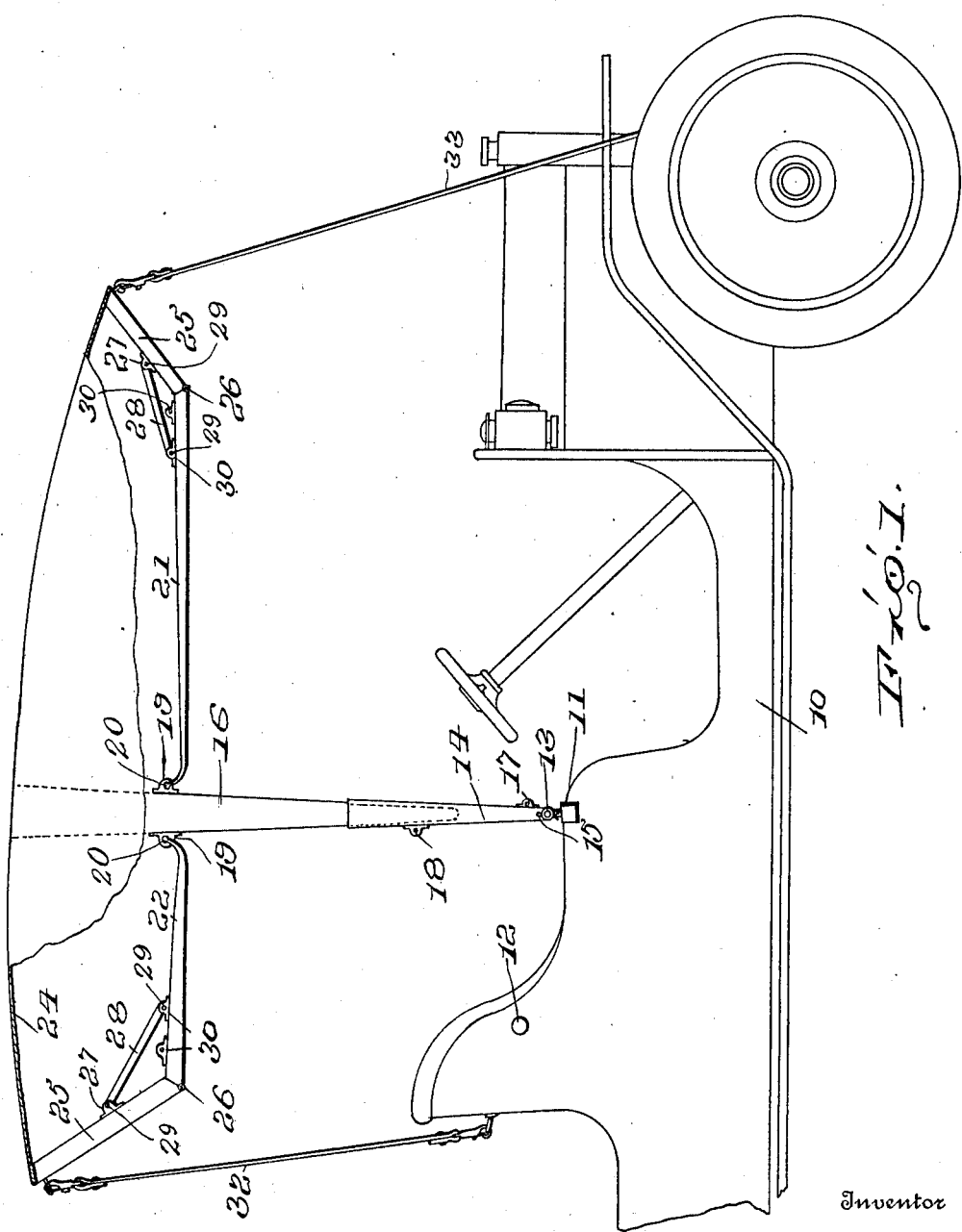

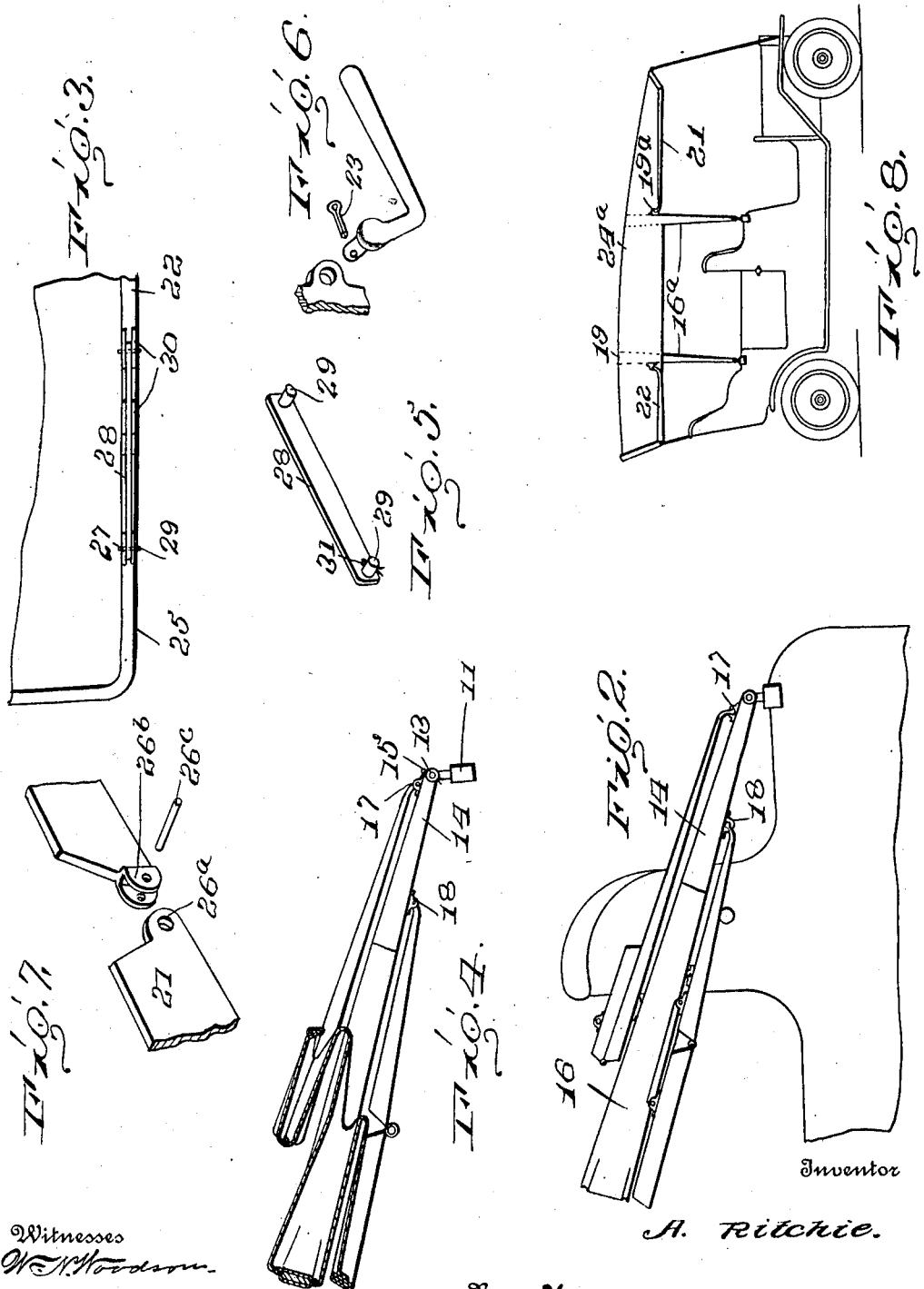

ALEXANDER RITCHIE, OF DETROIT, MICHIGAN.

VEHICLE-TOP.

1,026,368. Specification of Letters Patent. Patented May 14, 1912.

Application filed March 13, 1911. Serial No. 614,116.

*To all whom it may concern:*

Be it known that I, ALEXANDER RITCHIE, citizen of the United States, residing at Detroit, in the county of Wayne and State of Michigan, have invented certain new and useful Improvements in Vehicle-Tops, of which the following is a specification.

This invention has reference to a vehicle top, and has for an object to provide a top more particularly adapted to motor vehicles.

The invention has for one object to provide a top which is so constructed that the supporting structure of the top is connected to the sides of the body of the vehicle by a pair of vertically disposed bows for each seat of the vehicle, thereby eliminating the diagonal bows and arms which usually extend up from the seats of the vehicle and make it difficult to gain access to or egress from the vehicle.

The invention has for another object to provide a vehicle top having relatively small bows at the ends to which the terminal portions of the top fabric are attached and which are adjustable to enable the forward portion of the top to be disposed into parallel relation to the supporting members when the top is folded and thus protect the lining of the top and obviate the necessity for employing a dust shield.

This invention still further contemplates a top which includes but few parts, the same being so arranged and hingedly supported upon the main bows that a substantial structure is produced which can be quickly folded and set up, and one which may be economically manufactured.

For a full understanding of the invention and the merits thereof and also to acquire a knowledge of the details of construction, reference is to be had to the following description and accompanying drawings, in which:

Figure 1 is a side elevation of a vehicle having the top applied thereto, part of the same being disclosed in section; Fig. 2 is a side elevation of the top folded down upon the seat of the vehicle and without the fabric cover; Fig. 3 is a top plan view of one end of the top; Fig. 4 is a side elevation of the top folded, with the fabric cover in section; Fig. 5 is a detail view of one of the braces; Fig. 6 is a detail view of the connection between the bow and one of the spacing bars; Fig. 7 discloses a modified form of the hinged joint between the spacing bars and the ribs; and Fig. 8 is a side elevation of a motor vehicle having two seats and a modified form of the improved top applied thereto.

Corresponding and like parts are referred to in the following description and indicated in all the views of the drawings by the same reference characters.

Referring to the drawings 10 designates the body of a motor vehicle provided in the usual manner with the top irons 11 and the top props 12. The top irons 11 are shown as disclosed at the sides of the seat of the vehicle 10 adapted to receive studs 13 projecting outwardly from the lower ends of sockets 14 and held in such position by cotter pins 15. A main intermediate bow 16 is fitted in the sockets 14 at its opposite ends and adapted to extend up over the body 10. The sockets 14 are provided at their forward edges and adjacent to their lower ends with outstanding ears 17, and carry at their rear edges and adjacent to their upper ends outstanding ears 18. The intermediate bow 16 is also provided at its forward and rear edges with a pair of registering upper ears 19 receiving therethrough studs 20 formed upon the inner ends of forward and rear spacing bars 21 and 22 respectively. Cotter pins one of which is shown at 23 in Fig. 6 pass through the outer ends of the studs 20 to detachably hold the spacing bars 21 and 22 upon the upper end of the bow 16. A cover 24 is disposed over the bow 16 and is supported at its forward and rear edges upon smaller arched terminal bows 25. The arched terminal bows 25 are attached to the outer ends of the spacing bars 21 and 22 by hinges 26. The upper edges of the terminal bows 25 are provided with upstanding apertured ears 27 which hingedly support the outer ends of braces 28.

The braces 28, as disclosed in Fig. 5, are each formed of a flat bar having laterally extending studs 29 at their opposite ends adapted for engagement in the ears 27 and in upstanding apertured ears 30 carried upon the upper edges of the spacing bars 21 and 22 adjacent to their outer ends. Each of the members 21—22 is provided with apertured ears 30 spaced apart as shown in Fig. 1, the object of the ears will be hereafter explained. Cotter pins one of which is shown at 31 in Fig. 5 pass through the outer ends of the studs 29 to detachably hold the braces 28 in position.

As will be noted from Fig. 1 the adjacent ends of the spacing bars 21 and 22 and their bows 25 are beveled so as to limit the upward swinging movement when the top is set up, and the forward braces 28 applied, but which permits the forward terminal bows to be folded into parallel relations to the spacer bars 22, as shown in Fig. 2. A retaining strap 32 is disposed between the back of the seat of the vehicle 10 and the rear end of the top 24 for the purpose of holding the top from swinging forward, while a forward retaining strap 33 is disposed between the forward end of the top 24 and the body 10.

From Fig. 7 it will be noted that the hinge 26 may be eliminated and that the outer end of the spacing bar 21, or 22, may be provided with an apertured extension 26ª for engagement between a pair of spaced apertured ears 26ᵇ formed, or carried upon, the ends of the rib 25. A rivet 26ᶜ engages through the ears 26ᵇ and the extension 26ª to hingedly support the rib upon the spacing bar.

It will be noted by reference to Fig. 1 that the apertured ears 30 are so spaced upon the outer ends of the spacing bars that one set of the ears are adapted to receive the studs 29 when the spacing bars are in a horizontal position, and that the other set of the ears receive the studs 29 when the bows 25 are turned down into longitudinal alinement with the spacing bars. It will also be noted by reference to Figs. 2 and 4 that the forward terminal bows are adapted to be turned into parallel relation to the spacer rods 21 when the braces 28 of the forward bow are released from the ears 30 as shown in Figs. 2 and 4, and thus fold the portion of the top 24 which is located over the forward terminal bow 25 over the lining of the top at the forward portion and protect the same, as hereafter explained.

In Fig. 8 is disclosed a slight modification of the invention, wherein the top is adapted for application to motor vehicles having two seats. In this modified form 16ª designates a pair of spaced bows mounted in a similar manner to the bow 16 and supporting an elongated top 24ª. The spacing bars 21 and 22 are mounted in brackets 19ª carried respectively upon the forward and rear edges of the forward and rear bows 16ª. In all other respects the construction is the same, the modification consisting of the provision of two intermediate bows having the forward and rear mechanism mounted respectively thereon in lieu of the single intermediate bow carrying the forward and rear mechanism at its opposite sides.

When it is desired to collapse or fold the top the studs 20 of the spacing bars 21 and 22 are removed from the upper ears 19 of the bow 16 and positioned in the lower ears 17 and 18 respectively. The forward retaining straps 33 are now released from the body 10 when the top can be swung back upon the props 12. The braces 28 of the rear terminal bow are removed from the inner ears 30 and positioned in the outer ears, whereby the rear terminal bows 25 are swung down into alinement with the spacing bars 22, and the braces 28 of the forward terminal removed and the forward terminal bow folded into parallel relations to the spacer members 21 as shown in Figs. 2 and 4. This arrangement positions the top in a compact folded position so as to occupy but small space upon the rear end of the machine. This arrangement also provides sufficient protection to the lining of the top, as before stated, and thus obviates the necessity for employing a dust shield.

Having thus described the invention, what is claimed is:

1. A vehicle top including an intermediate bow, pairs of spacing rods hingedly connected to the intermediate bow and extended forwardly and rearwardly from the same, terminal bows hinged to the rods, a fabric cover engaging over the various bows, braces detachably connected respectively to said terminal bows and to said rods and adapted to support the terminal bows in inclined position relative to the rods or in longitudinal alinement to the same, the forward terminal bow being also foldable into parallel relation with the forward rods to provide protection to the lining of the cover.

2. A vehicle top including an intermediate hinged supporting bow, pairs of oppositely extending spacing rods adjustably carried upon the intermediate bow, terminal bows hinged upon the outer ends of the spacing rods and adapted to swing against the lower sides thereof, braces carried upon the terminal bows, and means for adjustably connecting said braces with the rods.

3. In a vehicle top, sockets adapted to be hingedly connected to a vehicle body and provided with apertured ears extending forwardly and rearwardly of the same, an intermediate bow engaging by its terminals in said sockets and provided with forwardly and rearwardly extending perforated ears, spacing rods adapted to be connected at their inner ends to the ears of the bows when the top is extended and to the ears of the sockets when the top is folded, terminal bows hinged to the outer ends of the rods, a cover engaging over the various bows, braces swinging at one end from said terminal bows, and means for adjustably connecting said braces to the rods, whereby the terminal bows may be retained in upwardly inclined position or in longitudinal alinement with the rods.

In testimony whereof, I affix my signature in presence of two witnesses.

ALEXANDER RITCHIE. [L. S.]

Witnesses:
 JOSEPH MEDDA,
 CHAS. F. GRAHN.

Copies of this patent may be obtained for five cents each, by addressing the "Commissioner of Patents, Washington, D. C."